(12) United States Patent
Sammarco

(10) Patent No.: US 7,583,956 B2
(45) Date of Patent: Sep. 1, 2009

(54) SYSTEM AND METHOD OF CONFERENCING ENDPOINTS

(75) Inventor: Anthony J. Sammarco, Garner, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 467 days.

(21) Appl. No.: 11/412,445

(22) Filed: Apr. 27, 2006

(65) Prior Publication Data

US 2007/0253348 A1 Nov. 1, 2007

(51) Int. Cl.
*H04M 11/10* (2006.01)
*H04Q 11/00* (2006.01)
(52) U.S. Cl. .................................. 455/414.1; 370/261
(58) Field of Classification Search ................. 370/260; 455/414; 379/202.1
See application file for complete search history.

(56) References Cited

U.S. PATENT DOCUMENTS 5,619,508 A * 4/1997 Davis et al. .................. 370/495
5,838,665 A 11/1998 Kahn et al.
2002/0097708 A1 7/2002 Deng
2003/0169729 A1 * 9/2003 Bienn et al. .................. 370/353
2005/0152338 A1 * 7/2005 Chen et al. .................. 370/352

FOREIGN PATENT DOCUMENTS

EP 1161114 12/2001
GB 2391741 2/2004

OTHER PUBLICATIONS

PCT International Search Report, Application No. PCT/US2006/043912, Mailed Mar. 23, 2007.

* cited by examiner

*Primary Examiner*—Nick Corsaro
*Assistant Examiner*—Shannon R Brooks
(74) *Attorney, Agent, or Firm*—Coats & Bennett, P.L.L.C.

(57) ABSTRACT

A wireless communications device is a hub for a conference call between a user of the device, a first remote party, and a second remote party. The wireless communications device communicates with the first remote party over a first connection and with the second remote party over a second concurrently active connection. A circuit in the wireless communications device transcodes voice data received over the first and second connections so that the voice data may be shared between the parties.

11 Claims, 7 Drawing Sheets

SYSTEM AND METHOD OF CONFERENCING ENDPOINTS

BACKGROUND

The present invention relates generally to wireless communications devices, and particularly to wireless communications devices operating in a mode that is capable of maintaining simultaneous circuit-switched and packet-switched connections.

Some wireless communications devices are currently equipped to operate in a Dual Transfer Mode (DTM). DTM is a Third Generation Partnership Project (3GPP) feature defined for 2G networks that permits the wireless communications device to have a circuit-switched connection at the same time as a packet-switched connection. A similar technology, called "Dual RAB" or "MultiRAB," permits wireless communications devices to have simultaneous circuit-switched and packet-switched connections in a 3G network. Typical applications of this technology allow users to surf the internet or send and receive e-mail at the same time as making a voice call. Given this concurrent services ability and the requirement that networks be capable of supporting such operations, wireless communications devices that are capable of operating in a mode that maintains simultaneous circuit-switched and packet-switched connections are popular with users.

Other services, such as the ability to make conference calls, are also popular. A conference call connects a calling party to more than one called party. The called parties may be permitted to speak during the call, or merely listen to the conversation. Conference calls may be established, for example, when one of the parties on an existing call dials the telephone number of a new participant, or specifies the IP address of a new Voice over IP (VoIP) participant, to add that person to the existing call. In other cases, new participants are added when they call into a conference bridge specially set up at the network for that conference call.

Conventionally, the equipment used to support such calls is located in the network, such as a circuit-switched network. As such, the parties to the conference call may all have a connection to that same network.

SUMMARY

The present invention is directed to a wireless communications device capable of operating in a mode that maintains simultaneous circuit-switched and packet-switched connections. The wireless communications may be configured to act as a hub for a conference call involving two or more remote parties connected to disparate networks that use disparate encoding protocols. In one embodiment, the user communicates with a first remote party over a circuit-switched connection and with a second remote party over a concurrently active packet-switched connection.

The wireless communications device comprises a controller and a transceiver. The transceiver sends and receives data to and/or from first and second remote parties during a conference call. The first and second remote parties are communicatively connected to each other through the wireless communications device. The controller shares data sent from and received by the wireless communications device during the conference call with each of the first and second remote parties.

DETAILED DESCRIPTION

In one embodiment of the present invention, a wireless communications device operating in a mode capable of maintaining simultaneous circuit-switched and packet-switched connections acts as a bridge or hub to provide conference call services between a user of the wireless communications device and two or more remote parties. The remote parties communicate with the user of the wireless communications device over disparate networks, each of which may use a different protocol to encode data transmitted over the networks. The wireless communications device transcodes the data between the disparate data encoding protocols before sharing the data with the remote parties.

Figure 1:
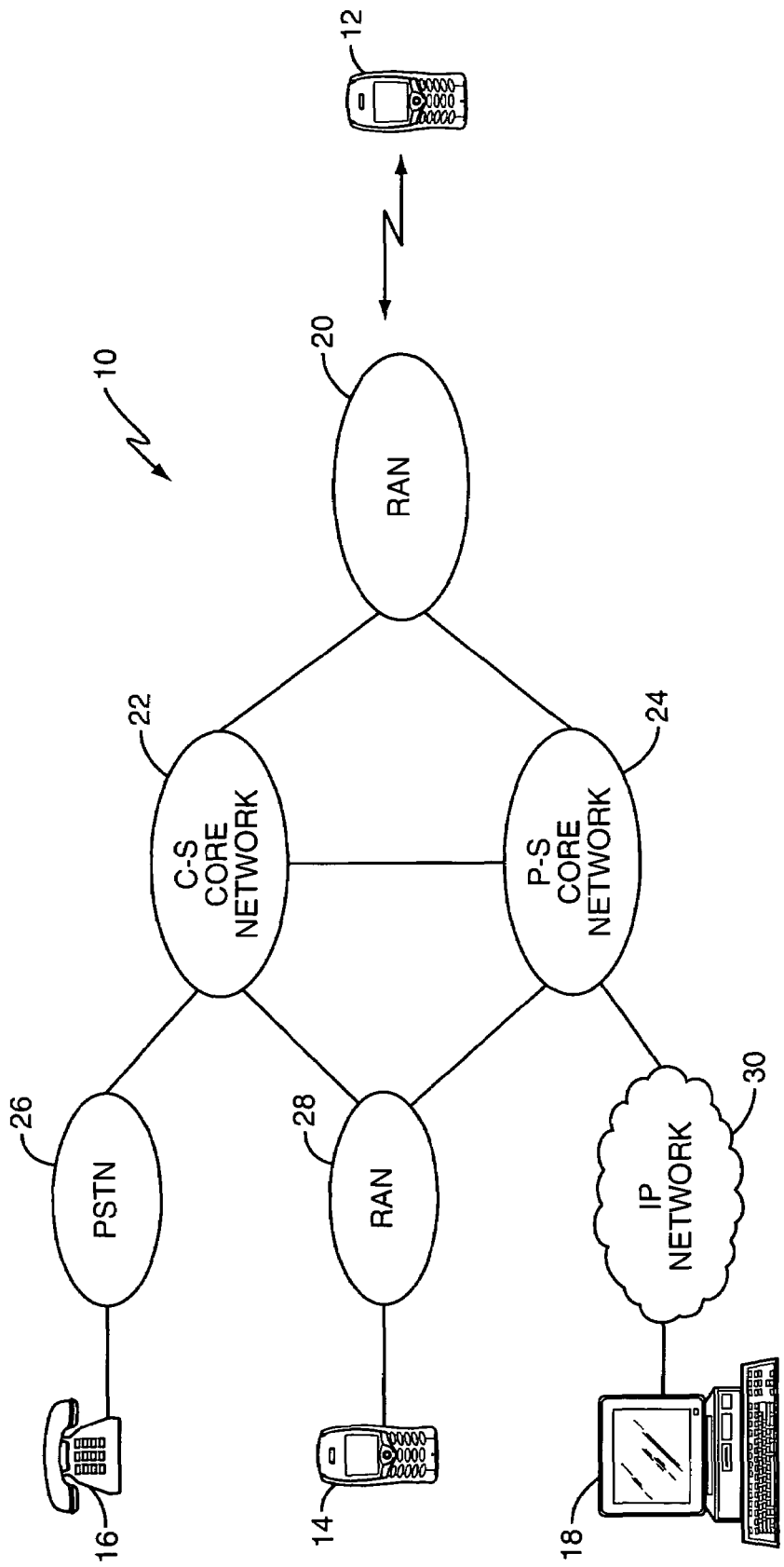
FIG. 1 illustrates an example of a communications system suitable for use with one embodiment of the present invention.

FIG. 1 illustrates an exemplary communications network indicated generally by the numeral 10. Network 10 is an example of a system that is suitable for use in a conference call between a user of a wireless communications device 10 operating in a mode capable of maintaining simultaneous circuit-switched and packet-switched connections, and one or more remote parties 14, 16, 18. Each of the network components and their interactions are well documented and understood by those in the art. Therefore, only a brief description of their functionality and their interaction is included herein for context.

Network 10 includes a radio access network (RAN) 20, a circuit-switched core network (CS-CN) 22, and a packet-switched core network (PS-CN) 24. The RAN 20 supports radio communications with wireless communications device 12 over an air interface. The RAN 20 may comprise, for example, a UMTS RAN (UTRAN), cdma2000, GSM, or other radio access network.

The CS-CN 22 provides a connection to the Public Switched Telephone Network (PSTN) 26 and/or an Integrated Digital Services Network (ISDN) for circuit-switched services, such as voice services, fax services, or other data services. A remote party 16 using a landline device such as a household telephone, for example, may connect to the CS-CN 22 and the wireless communications device 12 via the PSTN 26. The CS-CN 22 may also connect to one or more additional RANs 28 to connect one or more additional remote parties 14 using other wireless devices. In some embodiments, the CS-CN 22 interconnects with the PS-CN 24 using methods well known in the art.

The PS-CN 24 provides the wireless communications device 12 access to an IP network 30 such as the Internet or other packet data network (PDN). Typically, the wireless communications device 12 accesses the PS-CN 24 via RAN 20 or other access point. However, the wireless communications device 12 may access the IP network 30 via another access point as described later. A remote party 18 using a computing device such as a personal computer or other wireless device, for example, may connect to the PS-CN 24 and the wireless communications device 12 via the IP network 30.

As those skilled in the art will appreciate, the CS-CN 22 and the PS-CN 24 are disparate in the sense that they may each carry data that is encoded and decoded according to a different protocol. One reason for this may be because different networks typically address different sets of factors that affect data quality. Whatever the reasons for such disparities, the protocols used in each network may be selected to address factors specific to a particular network and may not be compatible. This may present a problem for parties connected to different networks wishing to communicate on a conference call, for example.

Figure 2:
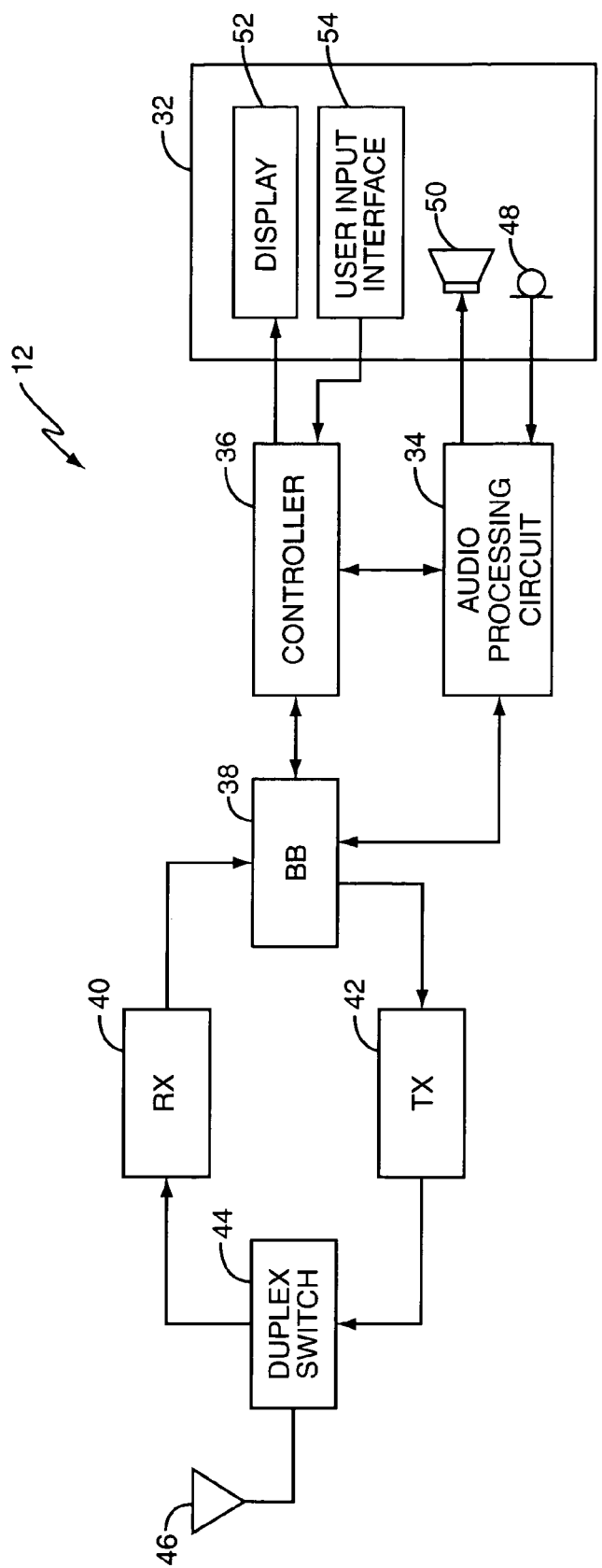
FIG. 2 is a functional block diagram that illustrates a wireless communications device configured to operate according to one embodiment of the present invention.

FIG. 2 illustrates one embodiment of a wireless communications device 12 that is configured to address such a situation. It should be understood that as used herein, the term "wireless communications device" connotes a broad array of device types, or a mix of such device types. For example, the wireless communications device 12 illustrated in the figures may comprise a cellular radiotelephone, a Portable Digital Assistant (PDA), a palmtop or laptop computer or a communication module included within a computer, a satellite phone, or other type of wireless communication device. It also should be understood that the architectural details of the wireless communications device 12 and the particular circuit elements incorporated therein may vary according to its intended use.

As seen in FIG. 2, the illustrated wireless communications device 12 comprises a device that is capable of operating in a Dual Transfer Mode (DTM). As referred to herein, the term "DTM mode" connotes a mode wherein a wireless communications device engages in communications over simultaneously active circuit-switched and packet-switched connections. This includes, but is not limited to, wireless communications devices operating in a DTM mode in 2G networks as well as wireless communications devices operating in a "Dual RAB" or "MultiRAB" mode in 3G networks.

In FIG. 2, the wireless communications device 12 may have a circuit-switched connection to remote party 14 and/or 16, and a concurrently active packet-switched connection to remote party 18. As described in more detail below, the wireless communications device 12 may be configured to share data sent and/or received by the user of wireless communications device 12, and one or all of the remote parties 14, 16, 18. The details of how these links are established are well known, and thus, not described in detail herein.

The wireless communications device 12 comprises a user interface (UI) 32, an audio processing circuit 34, a system controller 36, baseband control circuit(s) 38, a receiver 40, a transmitter 42, a switch/duplexer 44, and a receive/transmit antenna 46. The UI 32 includes a microphone 48, a speaker 50, a display 52, and one or more user input devices 54. Microphone 48 converts the user's speech into electrical audio signals and speaker 50 converts audio signals into audible signals that can be heard by the user. The audio processing circuit 34 provides basic analog output signals to speaker 50 and accepts analog audio inputs from microphone 48. Display 52 allows the user to view information. User input devices 54 receives user input.

The antenna 46 allows the wireless communications device 12 to receive incoming transmissions over the circuit-switched and packet-switched connections. The antenna 46 further allows the wireless communications device 12 to transmit outbound signals over the circuit-switched and packet-switched connections. The switch/duplexer 44 connects the receiver 40 or the transmitter 42 to the antenna 46 accordingly. It should be understood that the receiver 40 and the transmitter 42 are illustrated herein as separate components; however, this is for purposes of discussion only. Some embodiments may integrate receiver 40 and transmitter 42 circuitry into a single component referred to herein as a transceiver.

Generally, a received signal passes from the receiver 40 to the baseband control circuit 38 for channelization demodulation and decoding. The baseband control circuit 38 may also perform speech encoding/decoding on the transmitted and received signals. The system controller 36, which controls the operation of the wireless communications device 12, may receive the decoded signal, or control the baseband control circuit 38 to send the decoded signal to the audio processing circuit 34 for further processing. The audio processing circuit 34 converts the decoded data in the signal from a digital signal to an analog signal for rendering as audible sound through the speaker 50.

In one embodiment, the baseband control circuit 38 decodes voice data received over the circuit-switched connection using an Adaptive Multi-Rate (AMR) scheme. AMR is a speech compression scheme used in some networks to encode voice data. AMR uses various techniques to optimize the quality and robustness of the voice data being transmitted over the network. AMR is defined in the 3GPP specification standard "3GPP TS 26.071 v6.0.0," Release 6, which is incorporated herein by reference in its entirety.

Baseband control circuit 38 may also decode packetized voice data received over the packet-switched connection using a G.711 compression scheme. G.711 encodes samples of voice signals sampled at 8000 times/second to generate a 64 Kbit/sec bit stream. G.711 is described in the ITO specification standard entitled "Pulse Code Modulation (PCM) of Voice Frequencies," which is incorporated herein by reference in its entirety.

For transmitted signals, the baseband control circuit 38 converts an analog signal such as voice detected at microphone 48 into a digital signal, and encodes the digital signal into data using the appropriate protocol for the network (e.g., AMR, G.711). The baseband control circuit 38 then performs channelization encoding and modulation as is known in the art. The modulated signal is then sent to transmitter 42 for transmission over the appropriate circuit-switched or packet-switched connection depending upon the intended remote party.

As stated above, the wireless communications device 12 may act as a hub or bridge to provide conference call services to some or all of the remote parties 14, 16, 18. Because the remote parties 14, 16, 18 are connected to the wireless communications device 12 over disparate connections (e.g., circuit-switched and packet-switched), they send and receive data using different data encoding/decoding protocols. The wireless communications device 12 functions to transcode the data into an appropriate format for each connection before sharing the data with the remote parties 14, 16, 18.

Figure 3A:
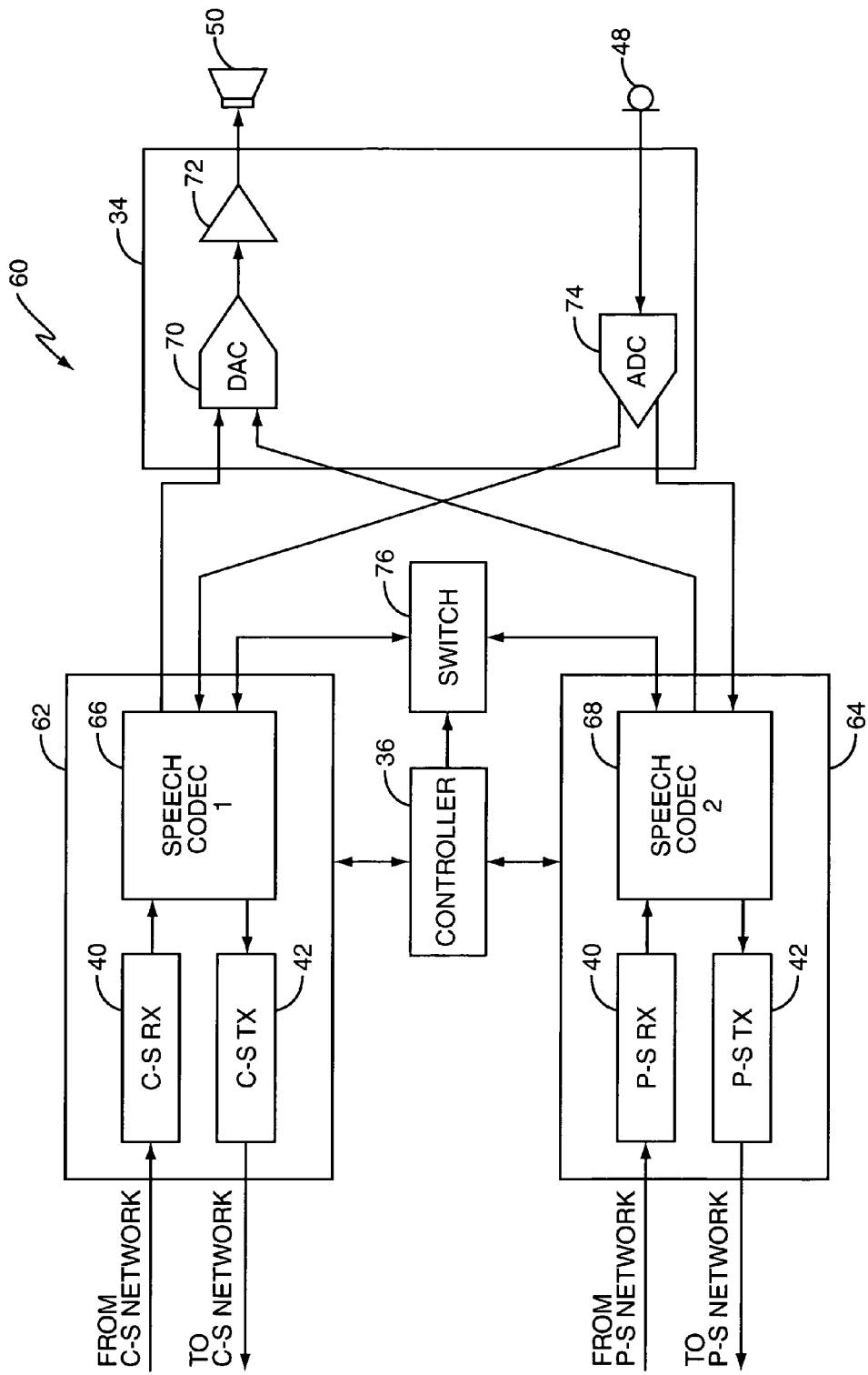
FIG. 3A is a functional block diagram that illustrates circuitry in the wireless communications device for performing an embodiment of the present invention.

FIG. 3A, for example, illustrates one embodiment of circuitry 60 used to share data sent to and received from the remote party 14 over the circuit-switched connection with the remote party 18 over the packet-switched connection. It should be understood that the wireless communications device 12 has established the circuit-switched and packet-switched connections with the remote parties 14, 18 such that both connections are concurrently active.

As seen in FIG. 3A, the circuitry 60 comprises a CS transmit/receive chain 62 capable of transmitting and receiving digital cellular signals to and from remote party 14. The CS transmit/receive chain 62 comprises the receiver 40, the transmitter 42, and a speech codec 66 to encode/decode voice data transmitted and/or received via the CS-CN 22. Circuitry 60 also comprises a PS transmit/receive chain 64 capable of transmitting and receiving packet data signals to and from remote party 18. The PS transmit/treceive chain 64 also comprises the receiver 40, the transmitter 42, and a speech codec 68 to encode/decode voice data transmitted and/or received via the PS-CN 24.

It should be noted that the figures illustrate two separate transmit/receive chains 62, 64 for illustrative purposes only. Those skilled in the art will appreciate, however, that the physical arrangement of the transmit/receive chains 62, 64 is immaterial. The transmit/receive chains 62, 64 may comprise a single transmit/receive chain comprising the receiver 40, the transmitter 42, and the speech codecs 66, 68 disposed in the baseband control circuitry 38. The controller 36 may generate control signals to control the flow of transmit and receive signals to the appropriate speech codec 66, 68.

As seen in FIG. 3A, the receiver 40 receives signals, such as digital cellular signals, from remote party 14 via the circuit-switched connection. Receiver 40 also receives packet data signals from remote party 18 via the packet-switched connection. Regardless of the connection, receiver 40 typically performs channelization demodulation and decoding as is known in the art to produce a digital signal. The system controller 36 may control the resultant digital signals to pass to an appropriate speech codec 66, 68 that decodes the data sent by the remote parties 14, 18 according to a protocol appropriate for the connection. In one embodiment, the speech decoder 66 decodes the voice traffic from remote party 14 according to the AMR protocol, and the packet data traffic sent from remote party 18 using the G.711 protocol. However, those skilled in the art will realize that other protocols may be used. The decoded speech signals, which are still in the digital domain, are then converted to analog signals using a digital to analog converter (DAC) 70. An amplifier 72 drives the speaker 50 to render the analog signals as audible sound for the user of the wireless communications device 12.

For transmitted signals, microphone 48 detects and converts the user's voice into analog signals. An analog-to-digital converter (ADC) 74 converts those signals into digital signals. The system controller 36 controls speech codecs 66, 68 to encode the user's speech according to the appropriate protocol for the circuit-switched and/or packet-switched connection. Transmitter 42 performs the appropriate channelization modulation and encoding, and transmits the signals to the remote parties 14, 18 over the circuit-switched and/or packet-switched connection.

In addition, the system controller 36 may also control circuitry 60 to re-encode decoded speech signals between the circuit-switched and packet-switched protocols for transmission to the remote parties 14, 18. This allows each of the remote parties 14, 18 to listen to the "other leg" of the ongoing conversation between the user of the wireless communications device 12 and the other remote party 14, 18 in substantially real-time.

In this embodiment, the system controller 36 generates a control signal to close a switch 76 when the user places the wireless communications device 12 in a DTM mode. Closing switch 76 connects speech codec 66 to speech codec 68 and allows the wireless communications device 12 to transcode signals between circuit-switched and packet-switched protocols while the signals are in the digital domain. Particularly, speech decoded signals output by speech codec 66 are re-encoded by speech codec 68 for transmission to the remote party 18 via the packet-switched connection. Likewise, speech decoded signals output by speech codec 68 are re-encoded by speech codec 66 for transmission to the remote party 14 via the circuit-switched connection.

Figure 3B:
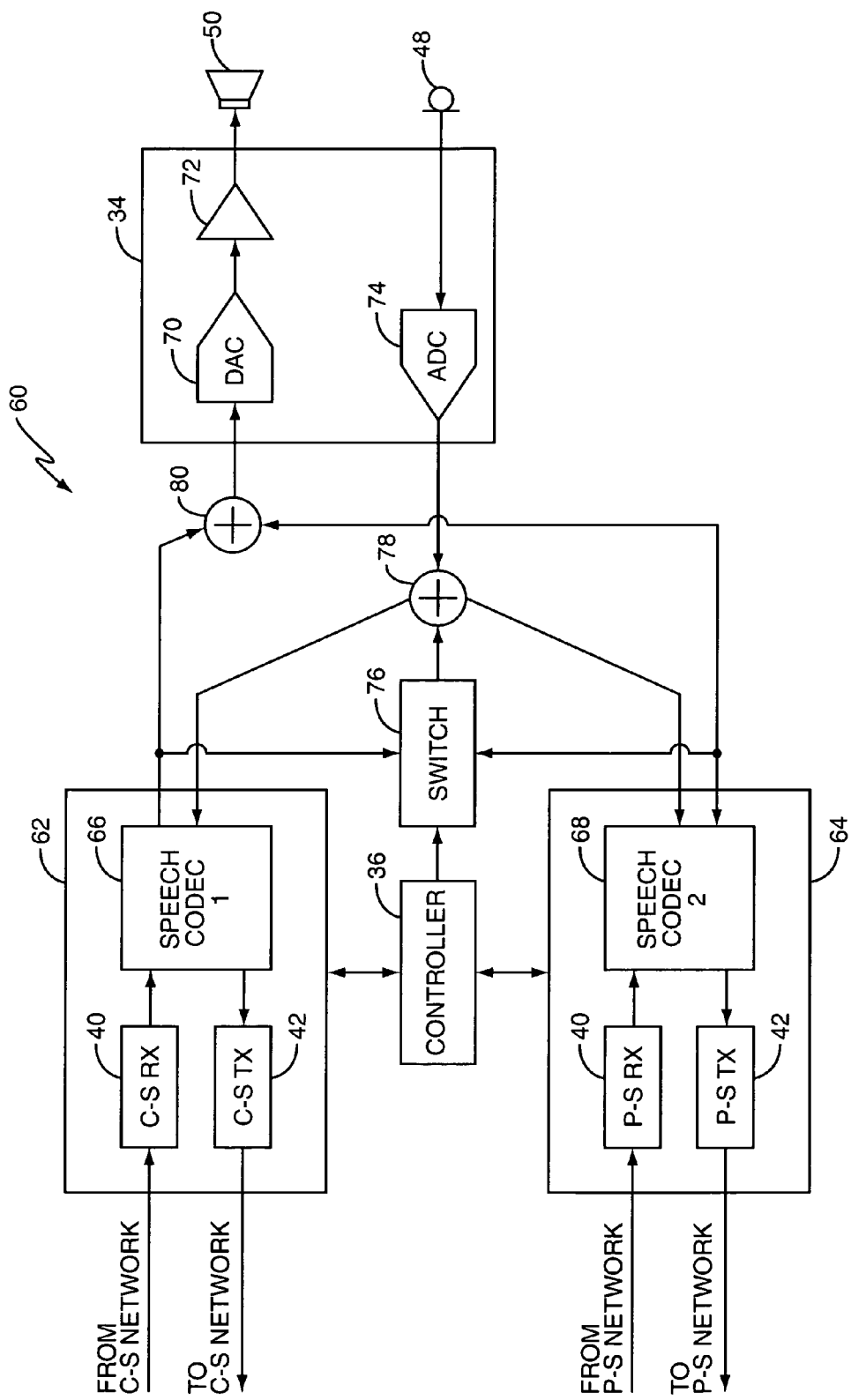
FIG. 3B is a functional block diagram that illustrates circuitry in the wireless communications device for performing an embodiment of the present invention.

FIG. 3B illustrates another embodiment of circuitry 60 where the transmitted and received signals are mixed in the digital domain to produce a composite digital signal prior to transmission to the remote parties 14, 18. Upon receipt, each of the remote parties 14, 18 may hear the "other leg" of the conversation as composite sound. Particularly, the digital representation of the user's voice output by ADC 74 and the output of the speech encoder 66 is input into a mixer 78. Mixer 78 mixes the two digital signals using any algorithm known in the art, and outputs the composite signal to speech codec 68. Speech codec 68 encodes the composite signal according using an appropriate packet-switched protocol for transmission over the packet-switched connection. In a like manner, mixer 78 also mixes the output of speech codec 68 and the user's voice, and outputs that composite signal to speech codec 66. Speech codec 66 encodes the composite signal using an appropriate circuit-switched protocol for transmission to remote party 14 via the circuit-switched connection.

Similarly, a mixer 80 may combine the outputs of both speech codecs 66, 68 to form a composite digital signal for rendering to the user. As seen in FIG. 3B, the composite digital signal representing the voice data of remote parties 14, 18 is mixed by mixer 80 and output to DAC 70. DAC 70 then converts the composite digital signal to an analog signal for rendering as audible sound over speaker 50.

Figure 4A:
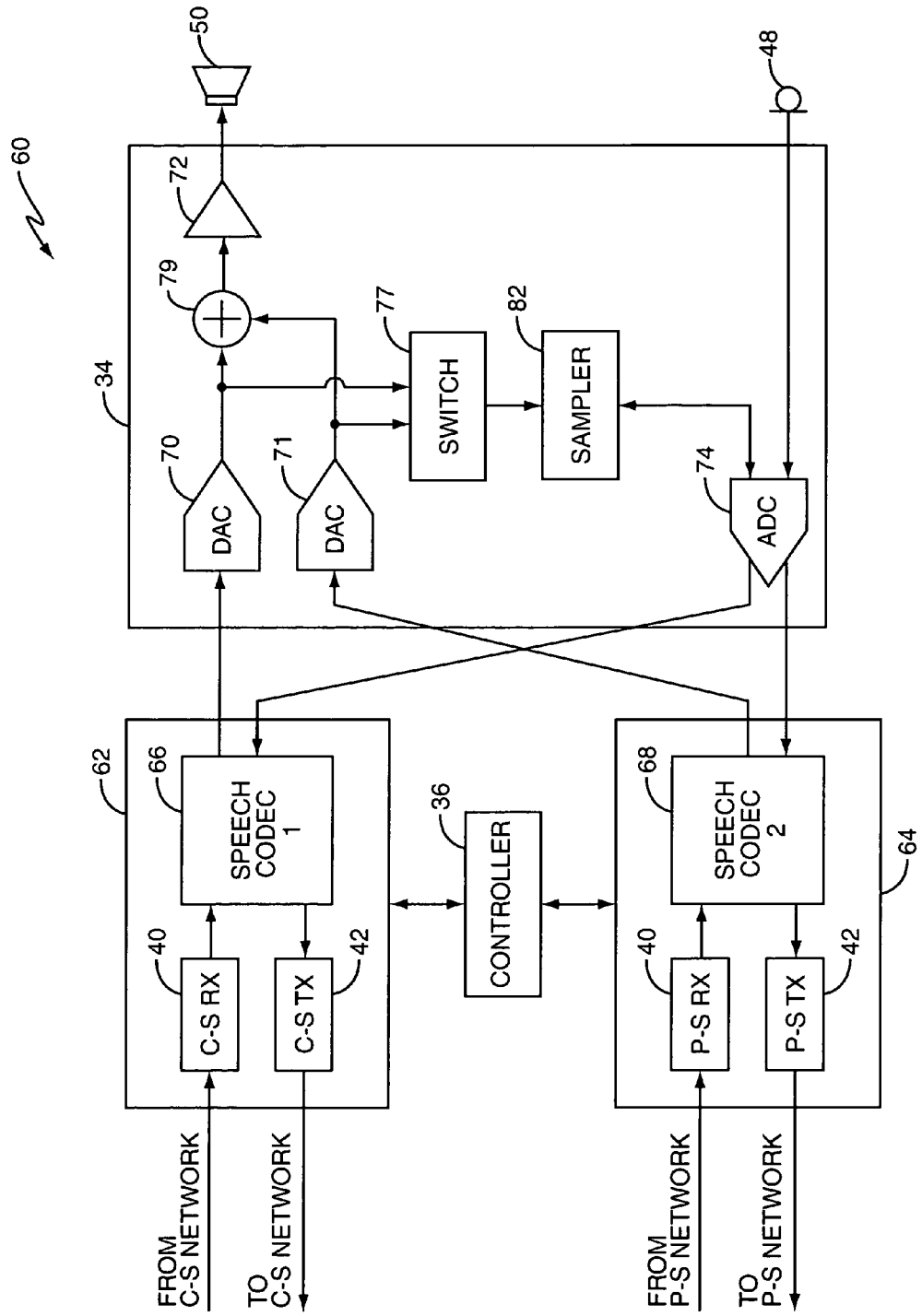
FIG. 4A is a functional block diagram that illustrates circuitry in the wireless communications device for performing an embodiment of the present invention.

FIG. 4A illustrates another embodiment wherein the circuitry 60 transcodes the decoded speech data in the analog domain to share between the user of the wireless communications device 12 and the remote parties 14, 18 during the conference call. In this embodiment, the audio processing circuitry 34 includes a pair of DACs 70, 71. The DAC 70 converts decoded voice data received over the circuit-switched connection to an analog signal for rendering to the user. The DAC 71 converts decoded packetized voice data received over the packet-switched connection to an analog signal for rendering to the user. A mixer 79 may mix the outputs of DAC 70, 71 to render a composite audible signal for the user at speaker 50. The system controller 36 may control a switch 77 to switch between the outputs of DAC 70, 71. A sampling circuit 82 may then sample that analog signal using any means known in the art to generate a sampled signal. The ADC 74 then converts the sampled signal into a digital signal. The system controller 36 controls the speech codecs 66, 68 to re-encode the signal output by the ADC 74 according using the appropriate protocol for transmission over the circuit-switched and/or packet-switched connections.

Figure 4B:
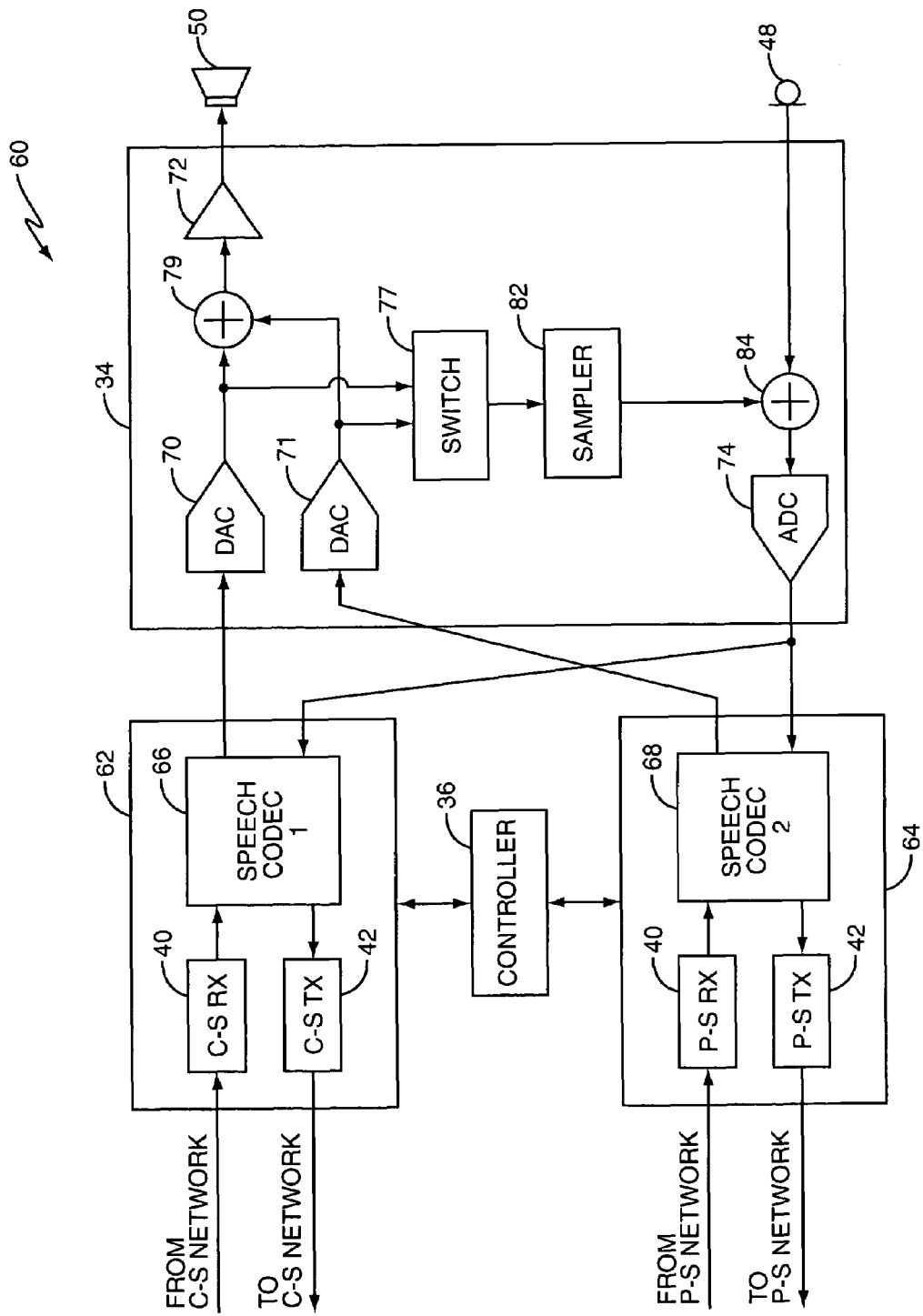
FIG. 4B is a functional block diagram that illustrates circuitry in the wireless communications device for performing an embodiment of the present invention.

FIG. 4B illustrates another embodiment where circuitry 60 further includes a mixer 84. Mixer 84 mixes the user's voice with the output of sampler 82 to generate a composite analog signal. ADC 74 converts the composite analog signal into a digital signal, and outputs the converted signal to one or both of speech codecs 66, 68. As above, speech codecs 66, 68 perform speech encoding using the appropriate circuit-switched and/or packet-switched protocols for transmission over the circuit-switched and/or packet-switched connections. Upon receipt, the remote parties 14, 18 perform decoding procedures appropriate for their particular connection to hear the conversation between the user of the wireless communications device 12 and the other remote party 14 or 18.

Figure 5:
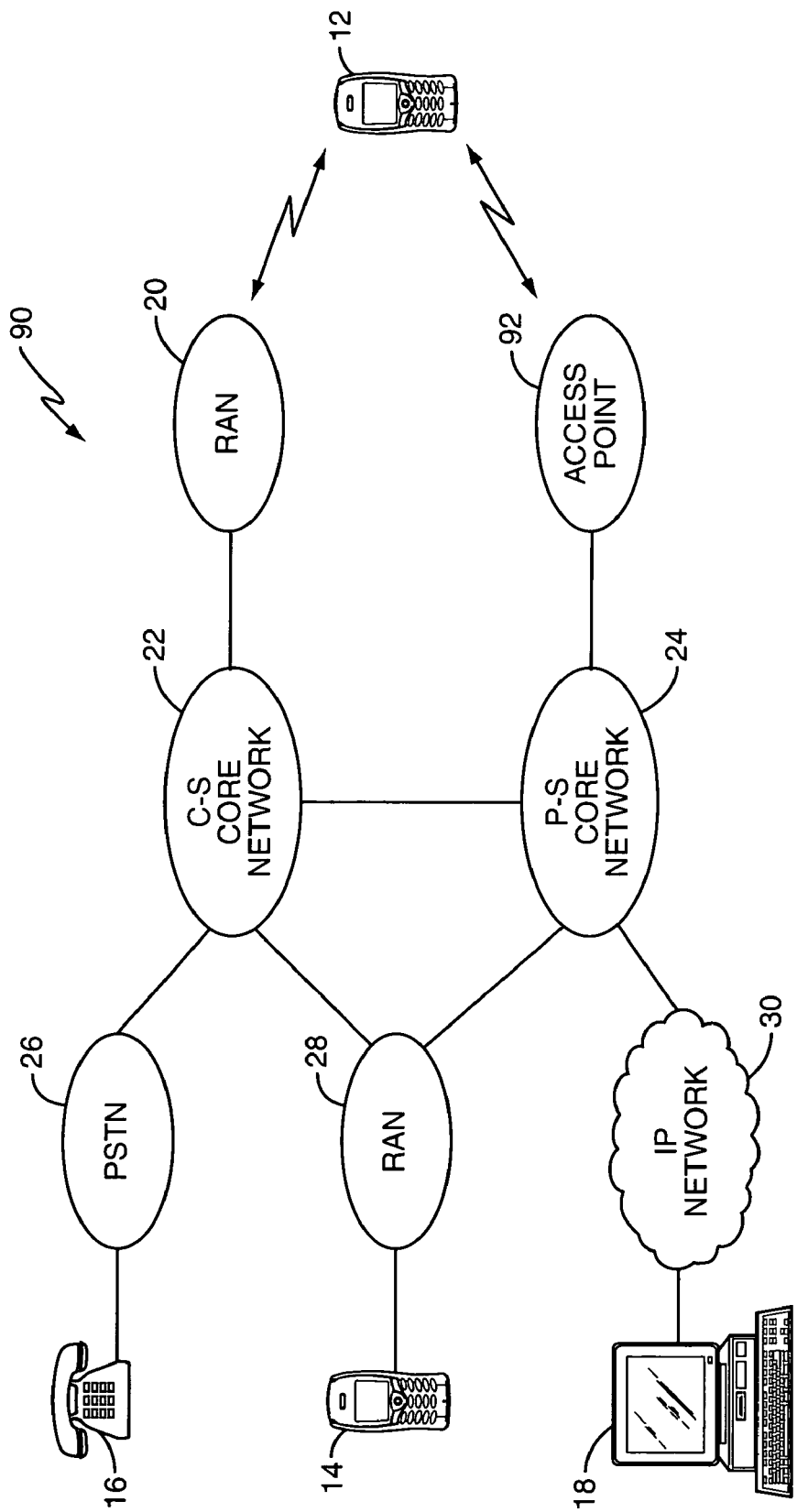
FIG. 5 is illustrates another example of a communications system suitable for use with one embodiment of the present invention.

It should be noted that the wireless communications device 12 is not limited to operation within the network 10 shown in FIG. 1. In that embodiment, the wireless communications device 12 communicates with the remote parties 14, 16, 18 over the respective circuit-switched and packet-switched connections via a single air interface with RAN 20. In another embodiment, however, the wireless communications device 12 is configured to establish and maintain concurrent circuit-switched and packet-switched connections over a plurality of air interfaces. FIG. 5, for example, illustrates another network 90 wherein the wireless communications device 12 connects to the CS-CN 22 via the RAN 20, and to the PS-CN 24 via an access point 92, which may comprise, for example, a WiFi hotspot according to the IEEE 802.11 standards. The wireless communications device 12 may communicate over each of these connections using a single transceiver 40, 42, or multiple transceivers 40, 42. Further, the present invention may be configured operate according to any type of codec, and thus, is not limited to the codecs specifically mentioned herein.

The previous embodiments have described the wireless communications device 12 as maintaining simultaneous circuit-switched and packet-switched connections. In other embodiments, however, the wireless communications device 12 may operate in a mode that is capable of maintaining a plurality of like connections, for example, two packet-switched connections or two circuit-switched connections, to two networks. In these embodiments, the wireless communications device 12 would act as a hub during a conference call with the remote parties as previously described.

The figures show the transcoding circuitry 60 as being disposed across several components within wireless communications device 12. However, this is for illustrative purposes only, and should not be considered as limiting. In one embodiment, for example, circuitry 60 may be contained with a single component such as a Digital Signal Processor (DSP). Likewise, speech codecs 66, 68 are shown as being separate speech codecs. This is not required, however, as a single speech codec may be used and controlled by controller 36 to perform the encoding/decoding procedures as appropriate for the type of connection (e.g., circuit-switched and packet-switched).

Additionally, the embodiments describe the present invention in the context of communicating voice traffic during the conference call. However, the present invention is not so limited. The wireless communications device 12 may also be configured to share other types of data with the remote parties 14, 16, 18 such as multimedia data (e.g., video, images).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of establishing a conference call at a wireless communications device, the method comprising:
    establishing a conference call at a wireless communications device operating in a dual transfer mode between the wireless communications device and first and second remote parties, the wireless communications device communicating with the first remote party over a circuit-switched connection and with the second remote party over packet-switched connection; and
    receiving, at the wireless communications device, inbound voice data from the first remote party over the circuit-switched connection, and inbound packetized voice data from the second remote party over the packet-switched connection;
    transcoding, at the wireless communications device, the inbound voice data into outbound packetized voice data by:
        mixing the inbound voice data with voice data generated at a microphone of the wireless communications device to generate composite packetized voice data; and
        encoding the composite packetized voice data to be transmitted over the packet-switched connection,
    transcoding, at the wireless communications device, the inbound packetized voice data into an outbound voice data by:
        mixing the inbound packetized voice data with voice data generated at the microphone of the wireless communications device to generate composite voice data;
        encoding the composite voice data to be transmitted over the circuit-switched connection; and
    transmitting the composite packetized voice data to the second remote party over the packet-switched connection, and transmitting the composite voice data to the first remote party ever the circuit-switched connection.

2. The method of claim 1 wherein receiving the inbound voice data at the wireless communications device comprises receiving voice data from the first remote party over the circuit-switched connection.

3. The method of claim 2 wherein mixing the outbound voice data with voice data generated at a microphone of the wireless communications device comprises:
    decoding the inbound voice data received over the circuit-switched connection;
    converting the decoded inbound voice data into an analog signal to be rendered as audible sound to a user of the wireless communications device;
    sampling the analog signal;
    mixing the sampled analog signal with the voice data generated at the microphone of the wireless communications device to produce the composite packetized voice data; and
    re-encoding the composite packetized voice data to produce the outbound packetized voice data.

4. The method of claim 1 wherein receiving the inbound packetized voice data at the wireless communications device comprises receiving voice data from the second remote party over the packet-switched connection.

5. The method of claim 4 wherein mixing the outbound packetized voice data with voice data generated at the microphone of the wireless communications device comprises:
    decoding the inbound packetized voice data received over the packet-switched connection;
    converting the decoded inbound packetized voice data into an analog signal to be rendered as audible sound to a user of the wireless communications device;

sampling the analog signal;

mixing the sampled analog signal with the voice data generated at the microphone of the wireless communications device to produce the composite voice data; and re-encoding the composite packetized voice data.

6. The method of claim 1 further comprising:

encoding the voice data generated at the microphone of the wireless communications device into a voice signal to be transmitted over the circuit-switched connection;

encoding the voice data into a packetized voice signal to be transmitted over the packet-switched connection; and transmitting the voice signal to the first remote party over the circuit-switched connection, and the packetized voice signal to the second remote party over the packet-switched connection.

7. The method of claim 1 further comprising rendering the inbound voice data received at the wireless communications device from the first remote party and the inbound packetized voice data received at the wireless communications device from the second remote party as audible sound through a speaker of the wireless communications device.

8. A wireless communications device comprising:

a microphone to generate audio signals from audible sound detected at the wireless communications device;

a controller configured to establish a conference call between the wireless communication device and first and second remote parties, wherein the wireless communications device communicates with the first remote party over a circuit-switched connection and with the second remote party over a concurrently active packet-switched connection;

a transceiver to receive data from the first remote party over the circuit-switched connection, and the second remote party over the packet-switched connection;

circuitry configured to transcode inbound voice data received over the circuit-switched connection into packetized voice data for transmission over the packet-switched connection, and transcode inbound packetized voice data received over the packet-switched connection into voice data for transmission over the circuit-switched connection, the circuitry comprising:

a first mixing circuit to mix the inbound voice data received over the circuit-switched connection with the audio signals to generate a first composite voice signal;

a first encoder to encode the first composite voice signal into composite packetized voice data to be transmitted over the packet-switched connection;

a second mixing circuit to mix the inbound packetized voice data received over the packet-switched connection with the audio signals to generate a second composite voice signal; and a second encoder to encode the second composite voice signal into composite voice data to be transmitted over the circuit-switched connection; and the transceiver further configured to transmit the composite voice data over the circuit-switched connection to the first remote party, and the composite packetized voice data over the packet-switched connection to the second remote party.

9. The device of claim 8 wherein the circuitry further comprises:

a decoder to decode the inbound voice data received over the circuit-switched connection;

a digital-to-analog converter to convert the decoded voice data into an analog signal to be rendered as audible sound to a user of the wireless communications device;

a sampling circuit to sample the analog signal; and wherein the first mixing circuit is configured to mix the sampled analog signal with the audio signals to generate the first composite voice signal.

10. The device of claim 8 wherein the circuitry comprises:

a decoder to decode the inbound packetized voice data received over the packet-switched connection;

a digital-to-analog converter to convert the decoded packet-switched voice data into an analog signal to be rendered as audible sound to a user of the wireless communications device;

a sampling circuit to sample the analog signal; and wherein the second mixing circuit is configured to mix the sampled analog signal with the audio signals to generate the second composite voice signal.

11. The device of claim 8 further comprising a speaker to render the inbound voice data and the inbound packetized voice data as audible sound to a user of the wireless communications device.

* * * * *

UNITED STATES PATENT AND TRADEMARK OFFICE
CERTIFICATE OF CORRECTION

| | | |
|---|---|---|
| PATENT NO. | : 7,583,956 B2 | Page 1 of 1 |
| APPLICATION NO. | : 11/412445 | |
| DATED | : September 1, 2009 | |
| INVENTOR(S) | : Anthony J. Sammarco | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 473 days.

Signed and Sealed this

Fourteenth Day of September, 2010

David J. Kappos
*Director of the United States Patent and Trademark Office*